(12) United States Patent
Ikemi et al.

(10) Patent No.: US 12,556,079 B2
(45) Date of Patent: Feb. 17, 2026

(54) MAGNETIC GEARED ROTATING MACHINE, POWER GENERATION SYSTEM, AND MAGNETIC POLE PIECE ROTOR

(71) Applicants: MITSUBISHI HEAVY INDUSTRIES, LTD., Tokyo (JP); MAGNOMATICS LIMITED, Sheffield (GB)

(72) Inventors: Takeshi Ikemi, Tokyo (JP); Takatoshi Matsushita, Tokyo (JP); Mikito Sasaki, Tokyo (JP); Stuart Calverley, Sheffield (GB); David Powell, Sheffield (GB)

(73) Assignees: MITSUBISHI HEAVY INDUSTRIES, LTD., Tokyo (JP); MAGNOMATICS LIMITED, Sheffield (GB)

( * ) Notice: Subject to any disclaimer, the term of this patent is extended or adjusted under 35 U.S.C. 154(b) by 227 days.

(21) Appl. No.: 18/281,089

(22) PCT Filed: Mar. 24, 2022

(86) PCT No.: PCT/JP2022/013849
§ 371 (c)(1),
(2) Date: Sep. 8, 2023

(87) PCT Pub. No.: WO2022/210237
PCT Pub. Date: Oct. 6, 2022

(65) Prior Publication Data
US 2024/0154511 A1    May 9, 2024

(30) Foreign Application Priority Data
Mar. 30, 2021 (JP) ................. 2021-058461

(51) Int. Cl.
*H02K 49/10*    (2006.01)
(52) U.S. Cl.
CPC .................. *H02K 49/102* (2013.01)

(58) Field of Classification Search
CPC ...... H02K 49/102; H02K 49/10; H02K 49/04; H02K 49/043; H02K 16/02; H02K 2213/03
(Continued)

(56) References Cited

U.S. PATENT DOCUMENTS 6,794,781 B2    9/2004    Razzell et al.
9,099,895 B2    8/2015    Atallah et al.
(Continued)

FOREIGN PATENT DOCUMENTS

CA    2650397 A1    11/2007
GB    2549449 A    10/2017
(Continued)

OTHER PUBLICATIONS

Extended European Search Report Issued in Corresponding EP Application No. 22780451.5, dated Aug. 28, 2024 (10 Pages).

*Primary Examiner* — Michael Andrews
(74) *Attorney, Agent, or Firm* — Osha Bergman Watanabe & Burton LLP

(57) ABSTRACT

A magnetic geared rotating machine, includes: a stator which includes a plurality of stator magnets arranged so as to be aligned in a circumferential direction; a rotor which includes a plurality of rotor magnets arranged so as to be aligned in the circumferential direction, and in which the number of magnetic poles of the plurality of rotor magnets is less than the number of magnetic poles of the plurality of stator magnets; and a magnetic pole piece rotor which includes a plurality of magnetic pole pieces arranged so as to be aligned in the circumferential direction at a radial position between the stator and the rotor.

18 Claims, 11 Drawing Sheets

(58) Field of Classification Search
USPC .................................. 310/103, 104, 105, 106
See application file for complete search history.

(56) References Cited

U.S. PATENT DOCUMENTS

| | | | |
|---|---|---|---|
| 10,680,502 | B2 | 6/2020 | Powell et al. |
| 2010/0283345 | A1 | 11/2010 | Atallah et al. |
| 2011/0012458 | A1* | 1/2011 | Atallah .................. H02K 51/00 310/103 |
| 2011/0133594 | A1* | 6/2011 | Atallah .................. H02K 51/00 310/216.113 |
| 2012/0146442 | A1 | 6/2012 | Atallah et al. |
| 2013/0320795 | A1* | 12/2013 | Enomoto ............... H02K 49/10 310/103 |
| 2018/0269770 | A1* | 9/2018 | Powell .................. H02K 49/102 |
| 2024/0154510 | A1* | 5/2024 | Ikemi .................... H02K 49/102 |
| 2024/0235360 | A1* | 7/2024 | Ikemi ...................... H02K 1/17 |

FOREIGN PATENT DOCUMENTS

| | | | |
|---|---|---|---|
| JP | 5643857 | B2 | 12/2014 |
| JP | 6403329 | B2 | 10/2018 |

* cited by examiner

MAGNETIC GEARED ROTATING MACHINE, POWER GENERATION SYSTEM, AND MAGNETIC POLE PIECE ROTOR

TECHNICAL FIELD

The present disclosure relates to a magnetic geared rotating machine, a power generation system, and a magnetic pole piece rotor.

This application claims the priority of Japanese Patent Application No. 2021-058461 filed on Mar. 30, 2021, the content of which is incorporated herein by reference.

BACKGROUND

Conventionally, a magnetic geared rotating machine is known which converts a rotation speed between two rotors to transmit a torque. For example, a magnetic geared rotating machine disclosed in Patent Document 1 includes, in order from a radially inner side, an inner rotor for supporting a plurality of permanent magnets, an external rotor including a plurality of magnetic pole pieces, and a stator. The stator is provided with a plurality of windings and a plurality of stator magnets. If the internal rotor rotates due to a rotating magnetic field generated in response to a three-phase alternating current flowing in the windings, a magnetic flux generated from the permanent magnets of the internal rotor is modulated by the magnetic pole pieces. The external rotor is rotated by the modulated magnetic field and the magnetic field of the stator magnets.

CITATION LIST

Patent Literature

Patent Document 1: JP5643857B

SUMMARY

Technical Problem

During operation of a magnetic geared rotating machine, if an axially flowing magnetic flux passes through a magnetic pole piece, an eddy current flows in the magnetic pole piece, resulting in an eddy current loss. Although a countermeasure for reducing the eddy current loss is required, it is preferable that this countermeasure affects magnetic paths in the plurality of stator magnets as little as possible.

An object of the present disclosure is to provide a magnetic geared rotating machine, a power generation system, and a magnetic pole piece rotor which are capable of reducing the eddy current loss while suppressing the affect on the magnetic paths of the stator magnets.

Solution to Problem

A magnetic geared rotating machine according to at least one embodiment of the present invention is a magnetic geared rotating machine that includes: a stator which includes a plurality of stator magnets arranged so as to be aligned in a circumferential direction; a rotor which includes a plurality of rotor magnets arranged so as to be aligned in the circumferential direction, and in which the number of magnetic poles of the rotor including the plurality of rotor magnets is less than the number of magnetic poles of the plurality of stator magnets; and a magnetic pole piece rotor which includes a plurality of magnetic pole pieces arranged so as to be aligned in the circumferential direction at a radial position between the stator and the rotor. In a radial cross section of the magnetic geared rotating machine, each of the magnetic pole pieces includes: an outer edge forming a first face of the magnetic pole piece, which is opposed to the rotor with a first air gap therebetween, and a second face of the magnetic pole piece, which is opposed to the stator with a second air gap therebetween; and at least one inner edge which is located between the first face and the second face in a radial direction so as to be surrounded by the outer edge, and defines at least one void inside the magnetic pole piece. In the radial cross section, a first distance which is a shortest distance between the first face and the void in the radial direction is shorter than a second distance which is a shortest distance between the second face and the void in the radial direction.

A power generation system according to at least one embodiment of the present invention, includes: a prime mover; and the above-described magnetic geared rotating machine which serves as a magnetic gear generator driven by an input from the prime mover to generate power.

A magnetic pole piece rotor according to at least one embodiment of the present invention, includes: a plurality of magnetic pole pieces arranged so as to be aligned in a circumferential direction; and a plurality of holders arranged in the circumferential direction alternately with the plurality of magnetic pole pieces. In a radial cross section, each of the magnetic pole pieces includes: an outer edge forming a first face facing one side in a radial direction and a second face facing the other side in the radial direction; and at least one inner edge which is located between the first face and the second face in the radial direction so as to be surrounded by the outer edge, and defines at least one void inside the magnetic pole piece. In the radial cross section, a first distance which is a shortest distance between the first face and the void in the radial direction is shorter than a second distance which is a shortest distance between the second face and the void in the radial direction.

Advantageous Effects

According to the present disclosure, it is possible to provide a magnetic geared rotating machine, a power generation system, and a magnetic pole piece rotor which are capable of reducing an eddy current loss while suppressing an affect on a magnetic path of a stator magnet.

DETAILED DESCRIPTION

Figure 1A:
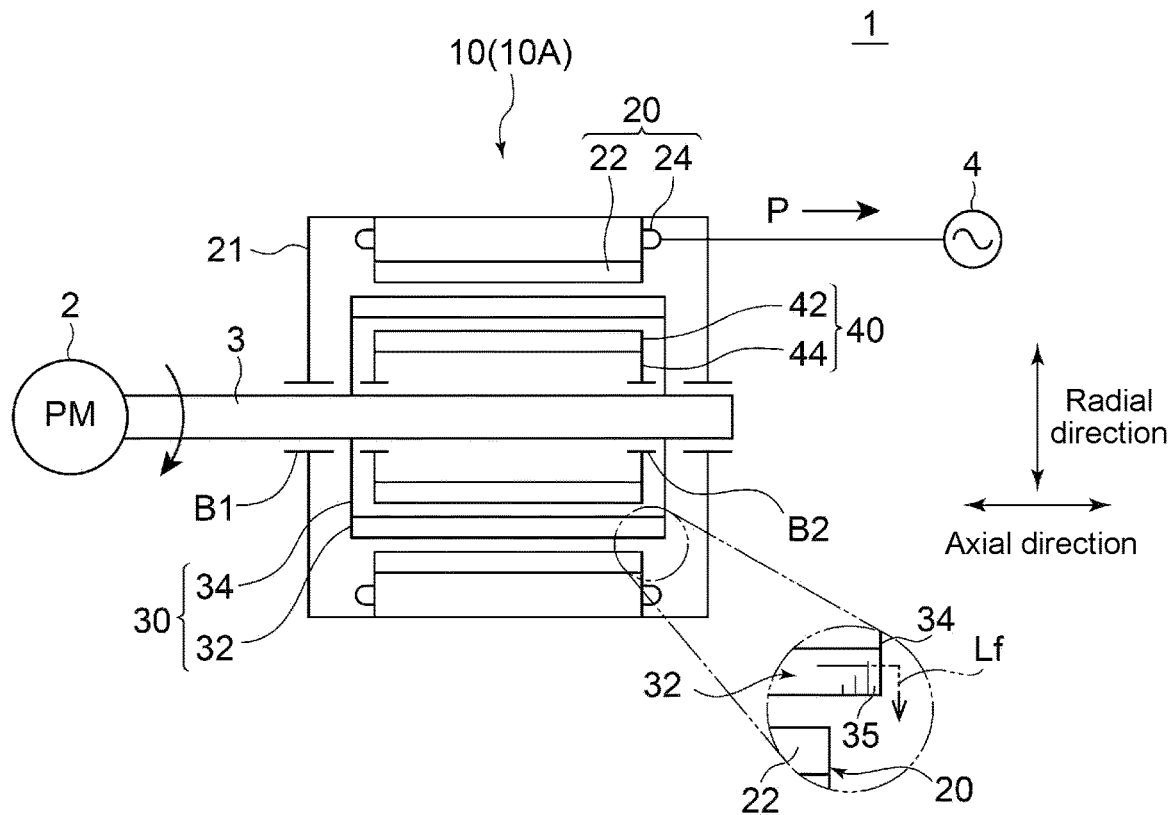
FIG. 1A is a schematic view showing a magnetic geared rotating machine according to an embodiment.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.
(Overview of Magnetic Geared Rotating Machine)

Figure 1B:
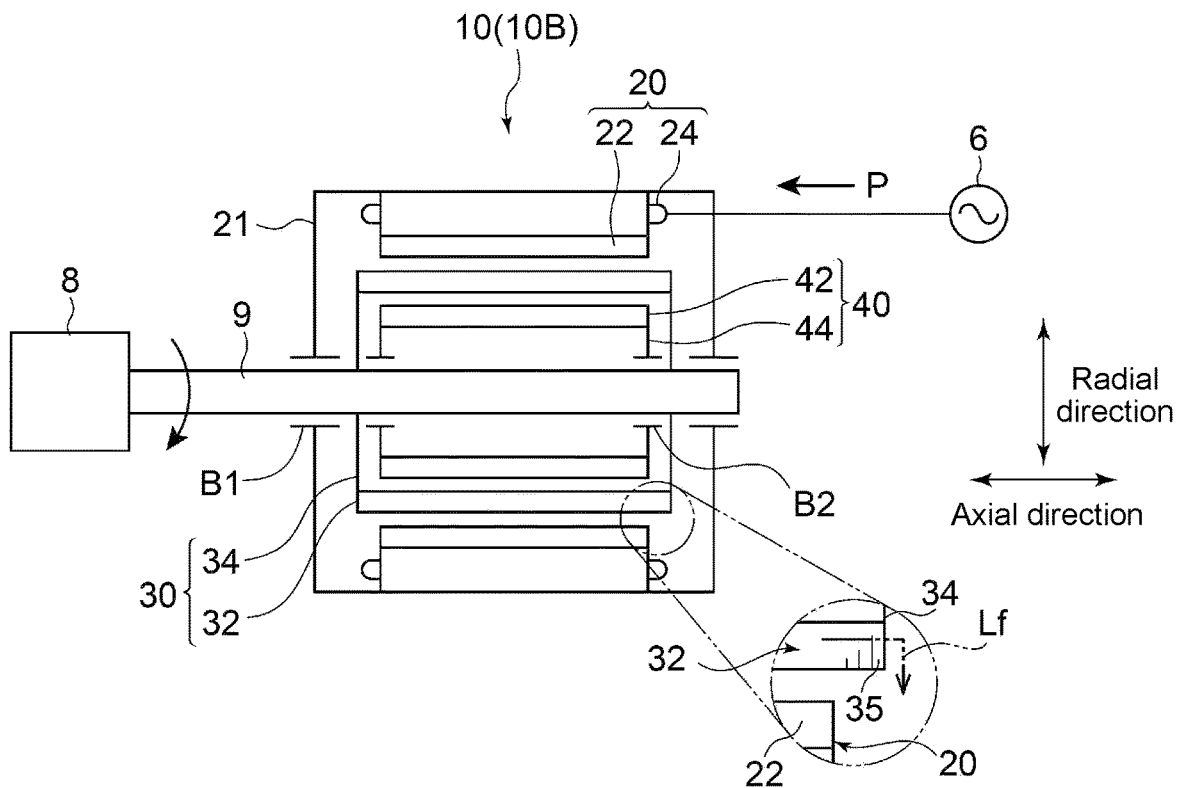
FIG. 1B is a schematic view showing a magnetic geared rotating machine according to another embodiment.

FIGS. 1A and 1B are each a schematic view showing an example of a magnetic geared rotating machine. Herein, in FIGS. 1A and 1B, the "axial direction" is a direction parallel to a rotational axis of a magnetic pole piece rotor 30 and a rotor 40 of a magnetic geared rotating machine 10, and the "radial direction" is a direction orthogonal to the rotational axis of the rotor 40 and a magnetic pole piece 32.

In an embodiment, as shown in FIG. 1A, the magnetic geared rotating machine 10 is a magnetic geared generator 10A driven by an input from a prime mover 2 to generate power. The magnetic geared generator 10A is configured to supply electric power P generated by the power generation to a power supply destination 4 which may be, for example, a power grid.

In another embodiment, as shown in FIG. 1B, the magnetic geared rotating machine 10 is a magnetic geared motor 10B configured to drive a rotating machine 8 upon receiving the electric power P supplied from a power supply source 6 which may be, for example, a power grid.

In the embodiment shown in FIG. 1A, the magnetic geared generator 10A constitutes part of a power generation system 1. The power generation system 1 may be, for example, a renewable energy power generation system such as a wind power generation system or a tidal current power generation system. If the power generation system 1 is a wind power generation system, the prime mover 2 is a wind turbine rotor. If the power generation system 1 is a tidal current power generation system, the prime mover 2 is a water turbine rotor.

The magnetic geared generator 10A includes a stator 20 including a stator magnet 22 and a stator winding 24, the magnetic pole piece rotor 30 including the magnetic pole piece 32, and a rotor 40 including a plurality of rotor magnets 42. In the example shown in FIG. 1A, the stator 20 is arranged inside a housing 21 for supporting a rotational shaft 3 of the prime mover 2 via a bearing B1. The magnetic pole piece rotor 30 is configured to rotate with the rotational shaft 3 of the prime mover 2. The magnetic pole piece 32 of the magnetic pole piece rotor 30 includes a plurality of axially laminated electrical steel sheets 35. The magnetic pole piece rotor 30 includes end rings 34 respectively disposed at axial both ends of the magnetic pole piece 32, and each of the end rings 34 is connected to the rotational shaft 3. The rotor 40 includes end plates 44 respectively disposed at axial both ends of the rotor magnet 42. Each of the end plates 44 is mounted on the rotational shaft 3 (or the magnetic pole piece rotor 30 rotating together with the rotational shaft 3) via a bearing B2 so as to allow the rotor 40 to rotate faster than the rotational shaft 3 and the magnetic pole piece rotor 30. The rotor 40 is disposed within a region surrounded by the rotational shaft 3 and the magnetic pole piece rotor 30 including the magnetic pole piece 32 and the end rings 34.

In the embodiment shown in FIG. 1A, the magnetic geared generator 10A has a configuration in which the stator 20, the magnetic pole piece rotor 30, and the rotor 40 are arranged in order toward the radially inner side. In another embodiment, the magnetic geared generator 10A has a configuration in which the rotor 40, the magnetic pole piece rotor 30, and the stator 20 are arranged in order toward the radially inner side. In this case, the rotor 40, the magnetic pole piece rotor 30, and the stator 20 are arranged radially inward of the cylindrical rotational shaft 3.

The above-described magnetic geared generator 10A has a structure in which a magnetic gear and a generator are integrated. The magnetic geared generator 10A is configured to convert a mechanical input from the prime mover 2 into electric power by utilizing a harmonic type magnetic gear principle and electromagnetic induction.

For example, power generation in the magnetic geared generator 10A may be performed according to the following principle. A magnetic flux of the stator magnet 22 is modulated by the magnetic pole piece 32 of the magnetic pole piece rotor (low-speed rotor) 30 rotating together with the rotational shaft 3 of the prime mover 2, and the rotor magnet 42 receives a magnetic force from the modulated magnetic field, thereby rotating the rotor (high-speed rotor) 40. At this time, the ratio (speed increasing ratio) of the rotation speed of the rotor 40 to the magnetic pole piece rotor 30 is expressed by a ratio of the number of magnetic poles $N_L$ of the magnetic pole piece 32 to the number of pole pairs $N_H$ of the rotor magnet 42 ($=N_L/N_H$). When the rotor 40 rotates, an electric current is generated in the stator winding 24 by electromagnetic induction. The number of magnetic poles $N_L$ of the magnetic pole piece 32 is less than the number of magnetic poles $N_S$ of the stator magnet 22.

During operation of the magnetic geared generator 10A, various magnetic fluxes such as an $N_H$-order magnetic flux (main magnetic flux) and a harmonic magnetic flux of higher-order than $N_H$-order (for example, an $N_H+N_S$-order magnetic flux) can occur inside the magnetic geared generator 10A. Some of these magnetic fluxes become leakage magnetic fluxes Lf axially passing through the magnetic pole pieces 32 in order to avoid the stator magnets 22, for example. If the leakage magnetic flux Lf is generated, an eddy current can be generated in the in-plane direction in each electrical steel sheet 35. Relatively large eddy currents can be generated in the electrical steel sheets 35 disposed in, for example, axial both end portions of the magnetic pole piece 32.

In the embodiment shown in FIG. 1B, the basic configuration of the magnetic geared motor 10B is common to the magnetic geared generator 10A shown in FIG. 1A.

That is, the magnetic geared motor 10B includes the stator 20 including the stator magnet 22 and the stator winding 24, the magnetic pole piece rotor 30 including the magnetic pole piece 32, and the rotor 40 including the plurality of rotor magnets 42. In the example shown in FIG. 1B, the stator 20 is fixed to the inside of the housing 21 for supporting a rotational shaft 9 of the rotating machine 8 via the bearing B1. The magnetic pole piece 32 of the magnetic pole piece rotor 30 includes the plurality of axially laminated electrical steel sheets 35. The magnetic pole piece rotor 30 includes the end rings 34 respectively disposed at the axial both ends of the magnetic pole piece 32, and each of the end rings 34 is connected to the rotational shaft 9. The rotor 40 includes the end plates 44 respectively disposed at the axial both ends of the rotor magnet 42. Each of the end plates 44 is mounted on the rotational shaft 9 (or the magnetic pole piece rotor 30 rotating together with the rotational shaft 9) via the bearing B2 so as to allow the rotor 40 to rotate faster than the rotational shaft 9 and the magnetic pole piece rotor 30. The rotor 40 is disposed within a region surrounded by the rotational shaft 9 and the magnetic pole piece rotor 30 including the magnetic pole piece 32 and the end rings 34.

In the embodiment shown in FIG. 1B, the magnetic geared motor 10B has the configuration in which the stator 20, the magnetic pole piece rotor 30, and the rotor 40 are arranged in order toward the radially inner side. In another embodiment, the magnetic geared motor 10B has the configuration in which the rotor 40, the magnetic pole piece rotor 30, and the stator 20 are arranged in order toward the radially inner side. In this case, the rotor 40, the magnetic pole piece rotor 30, and the stator 20 are arranged radially inward of the cylindrical rotational shaft 9.

The magnetic geared motor 10B has a structure in which the magnetic gear and a motor are integrated. The magnetic geared motor 10B rotates the rotor (high-speed rotor) 40 by a rotating magnetic field generated by energization of the stator winding 24. Power transmission from the rotor 40 to the magnetic pole piece rotor (low-speed rotor) 30 utilizes the principle of a harmonic magnetic gear.

During operation of the magnetic geared motor 10B, the axial leakage magnetic flux Lf can occur in the magnetic pole piece 32, as in the magnetic geared generator 10A. In this case, an eddy current can be generated in the in-plane direction in each magnetic pole piece 32. Relatively large eddy currents can be generated in the electrical steel sheets 35 disposed in, for example, the axial both end portions of the magnetic pole piece 32.

(Internal Structure of Magnetic Geared Rotating Machine)

Subsequently, an internal structure of the above-described magnetic geared rotating machine 10 (10A, 10B) will be described with reference to FIG. 2.

Figure 2:
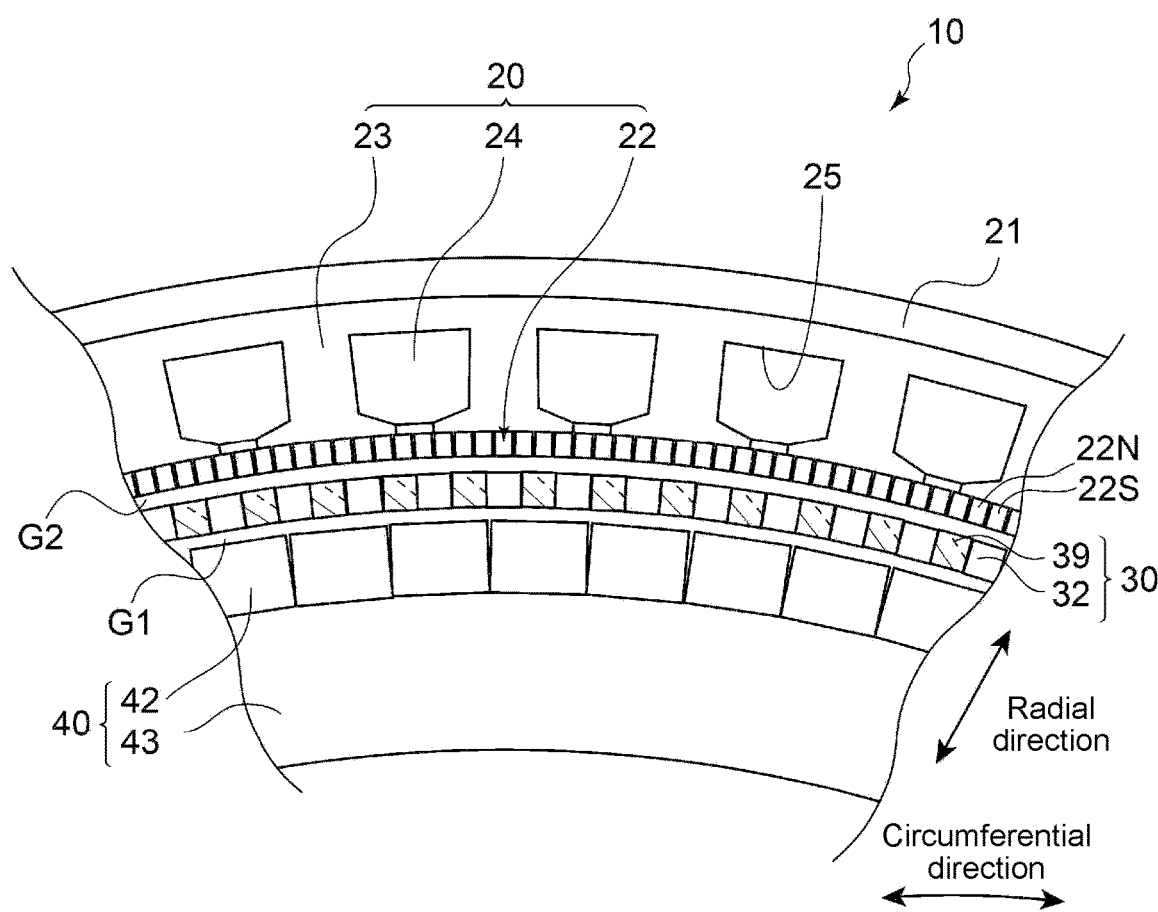
FIG. 2 is a radial cross-sectional view of the magnetic geared rotating machine according to an embodiment.

FIG. 2 is a radial cross-sectional view of the magnetic geared rotating machine 10 according to an embodiment. In FIG. 2, only some components of the magnetic geared rotating machine 10 are hatched for the sake of illustrative convenience. In FIG. 2, the "circumferential direction" is the circumferential direction based on the already-described "axial direction" (see FIG. 1A, 1B).

As shown in FIG. 2, the stator 20 of the magnetic geared rotating machine 10 includes the plurality of stator magnets 22 and stator windings 24 arranged so as to be aligned in the circumferential direction. The stator magnets 22 and the stator windings 24 are attached to a stator core 23.

The stator magnets 22 are composed of permanent magnets, and the plurality of stator magnets 22 are disposed in the circumferential direction so as to axially pass between the stator windings 24 and the magnetic pole piece rotor 30 in the radial direction. The plurality of stator magnets 22 of the present example are composed of a plurality of stator magnets 22N, 22S alternately arranged in the circumferential direction and having different magnetic poles. In the example shown in FIG. 2, each of the stator magnets 22 is an axially elongated rod shaped member having a rectangular cross section.

FIG. 2 shows the stator 20 having a surface permanent magnet (SPM) structure in which the stator magnets 22 are attached to the surface of the stator core 23. In another embodiment, the stator 20 may have an interior permanent magnet (IPM) structure in which the stator magnets 22 are embedded in the stator core 23.

The stator windings 24 are disposed within a plurality of slots 25 disposed in the stator core 23. The plurality of slots 25 are disposed in the circumferential direction, and each of the slots 25 extends in the axial direction. Axial both ends of each of the slots 25 are open, and coil ends of the stator winding 24 that do not fit into the slot 25 may protrude from the stator core 23 at axial both ends of the stator core 23.

The rotor 40 which is disposed at a position radially displaced from the stator 20 of the above-described configuration includes the plurality of rotor magnets 42 arranged so as to be aligned in the circumferential direction. The plurality of rotor magnets 42 are a plurality of permanent magnets alternately arranged in the circumferential direction and having different magnetic poles. The number of magnetic poles of the plurality of rotor magnets 42 is less than the number of magnetic poles of the plurality of stator magnets 22. Each of the rotor magnets 42 may be an elongated rod member having a rectangular cross section.

FIG. 2 shows the rotor 40 having a surface permanent magnet (SPM) structure in which the rotor magnets 42 are attached to the surface of the rotor core 43. In another embodiment, the rotor 40 may have an interior permanent magnet (IPM) structure in which the rotor magnets 42 are embedded in the rotor core 43.

Besides the rotor magnet 42 and the rotor core 43, the rotor 40 may include the end plate 44 described above with reference to FIGS. 1A and 1B. The end plate 44 is an annular plate extending along the radial direction from a mounting position of the bearing B2 toward the rotor core 43.

The magnetic pole piece rotor 30 includes the plurality of magnetic pole pieces 32 arranged so as to be aligned in the circumferential direction at a radial position between the stator 20 and the rotor 40 configured as described above. Each of the magnetic pole pieces 32 is opposed to the rotor 40 with a first air gap G1 therebetween, and each of the magnetic pole pieces 32 is opposed to the stator 20 with a second air gap G2 therebetween. For example, in an embodiment in which both the rotor 40 and the stator 20 have an embedded magnet type structure, the magnetic pole piece rotor 30 is opposed to the rotor magnet 42 with the first air gap G1 therebetween, and the magnetic pole piece rotor 30 is opposed to the stator magnet 22 with the second air gap G2 therebetween. In another embodiment, the magnetic pole piece rotor 30 may be opposed to each of the stator core 23 and the rotor core 43.

Further, the magnetic pole piece rotor 30 includes a plurality of holders 39 arranged in the circumferential direction alternately with the plurality of magnetic pole pieces 32. Each of the holders 39 according to an embodiment is formed by a non-magnetic material. In another embodiment, the holder 39 may be formed by a magnetic material. Each of the magnetic pole pieces 32 is sandwiched and held by two holders 39 disposed on circumferential both sides.

Each of the magnetic pole pieces 32 includes the already-described plurality of axially laminated electrical steel sheets 35 (see FIG. 1A, 1B).

Next, details of the further configuration of the magnetic pole piece rotor 30 will be described with reference to FIG. 3.

Figure 3:
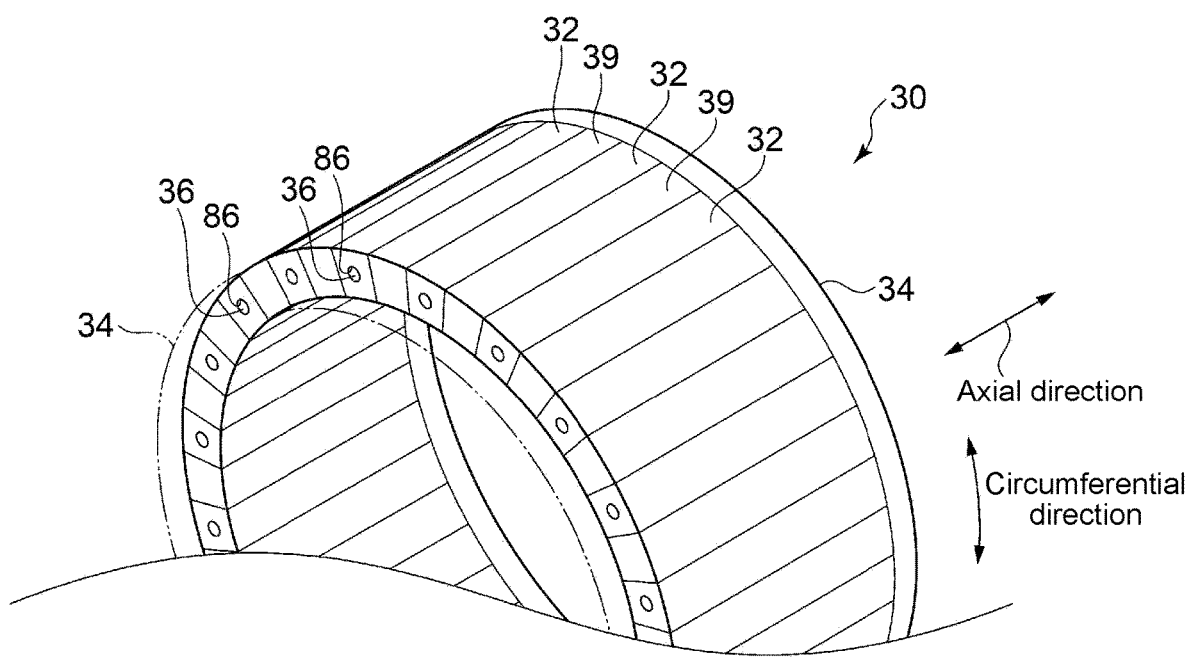
FIG. 3 is a perspective view of a magnetic pole piece rotor according to an embodiment.

FIG. 3 is a perspective view of the magnetic pole piece rotor 30 according to an embodiment.

As shown in FIG. 3, the magnetic pole piece rotor 30 includes a pair of end rings 34 respectively located on axial both sides with respect to the plurality of magnetic pole pieces 32 and the plurality of holders 39. One of the pair of end rings 34 is illustrated by a double-dotted chain line.

In the embodiment illustrated in FIG. 3, the magnetic pole piece rotor 30 includes a plurality of connecting bars 36 axially extending between the pair of end rings 34. Each of the connecting bars 36 is arranged in an axial hole 86 formed in each of the magnetic pole pieces 32, and is held by the pair of end rings 34. Since the plurality of connecting bars 36 are arranged, the magnetic pole piece rotor 30 can form an assembly of the plurality of magnetic pole pieces 32. Further, since the plurality of connecting bars 36 are arranged, it is possible to prevent the magnetic pole pieces 32 from shifting radially outward when the magnetic pole piece rotor 30 rotates. Each of the connecting bars 36 is formed by, for example, a non-magnetic material such as titanium or stainless steel.

In another embodiment, the magnetic pole piece rotor 30 may not include the plurality of connecting bars 36. In this case, the axial holes 86 may not be formed in the magnetic pole pieces 32. Even in such an embodiment, the magnetic pole piece rotor 30 can form the assembly of the plurality of magnetic pole pieces 32.

Next, details of the further configuration of the magnetic pole piece 32 will be described with reference to FIGS. 4A to 4G.

FIGS. 4A to 4G are cross-sectional views of magnetic pole pieces 32A to 32G (32) according to an embodiment. FIGS. 4A to 4G show, as an example, an embodiment in which both the rotor 40 and the stator 20 have a surface magnet type structure. Further, the illustrated components are not hatched and the illustration of the holder 39 (see FIG. 3) is omitted, for the sake of illustrative convenience.

Figure 4A:
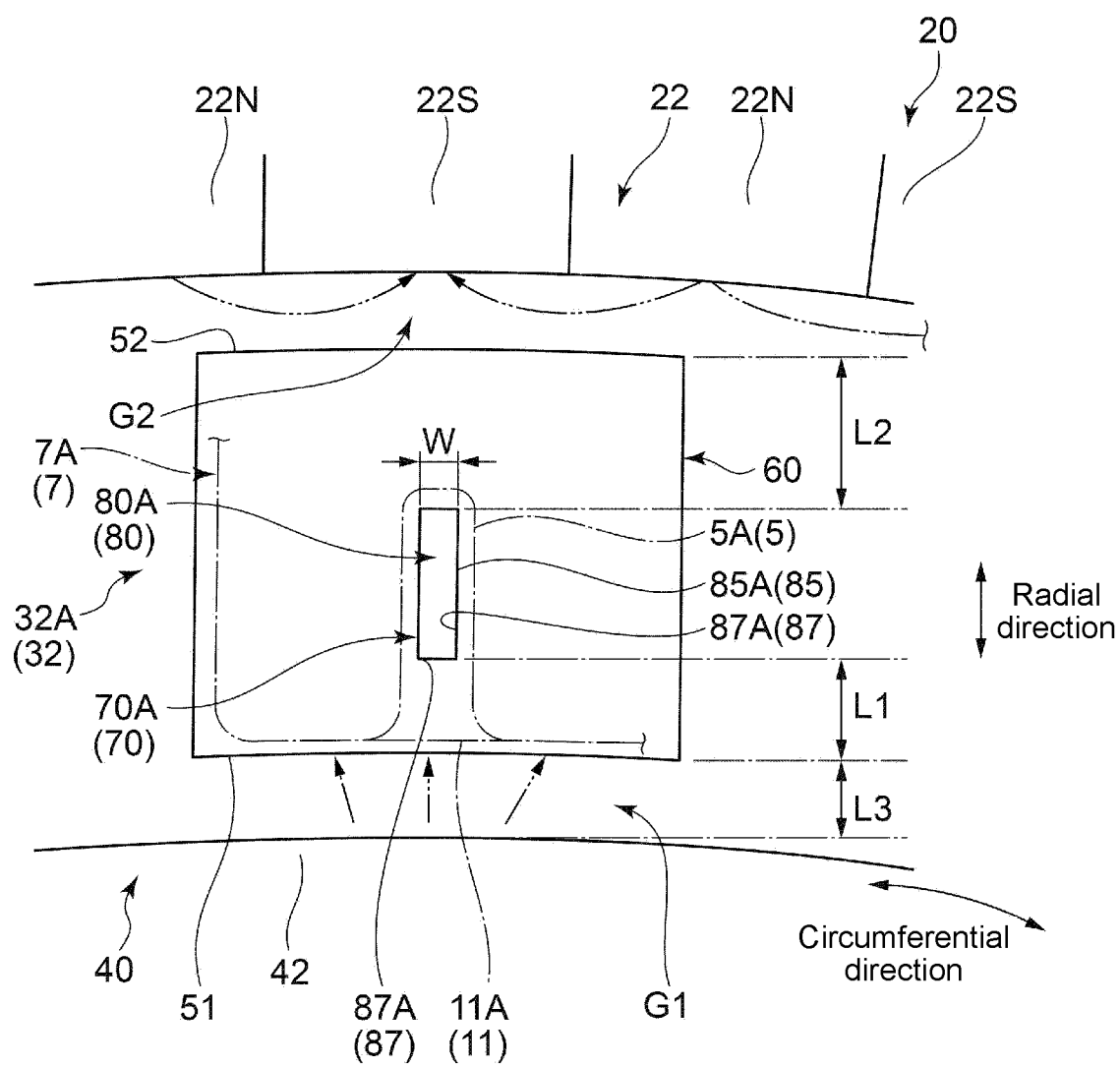
FIG. 4A is a cross-sectional view of a magnetic pole piece according to an embodiment.
Figure 4B:
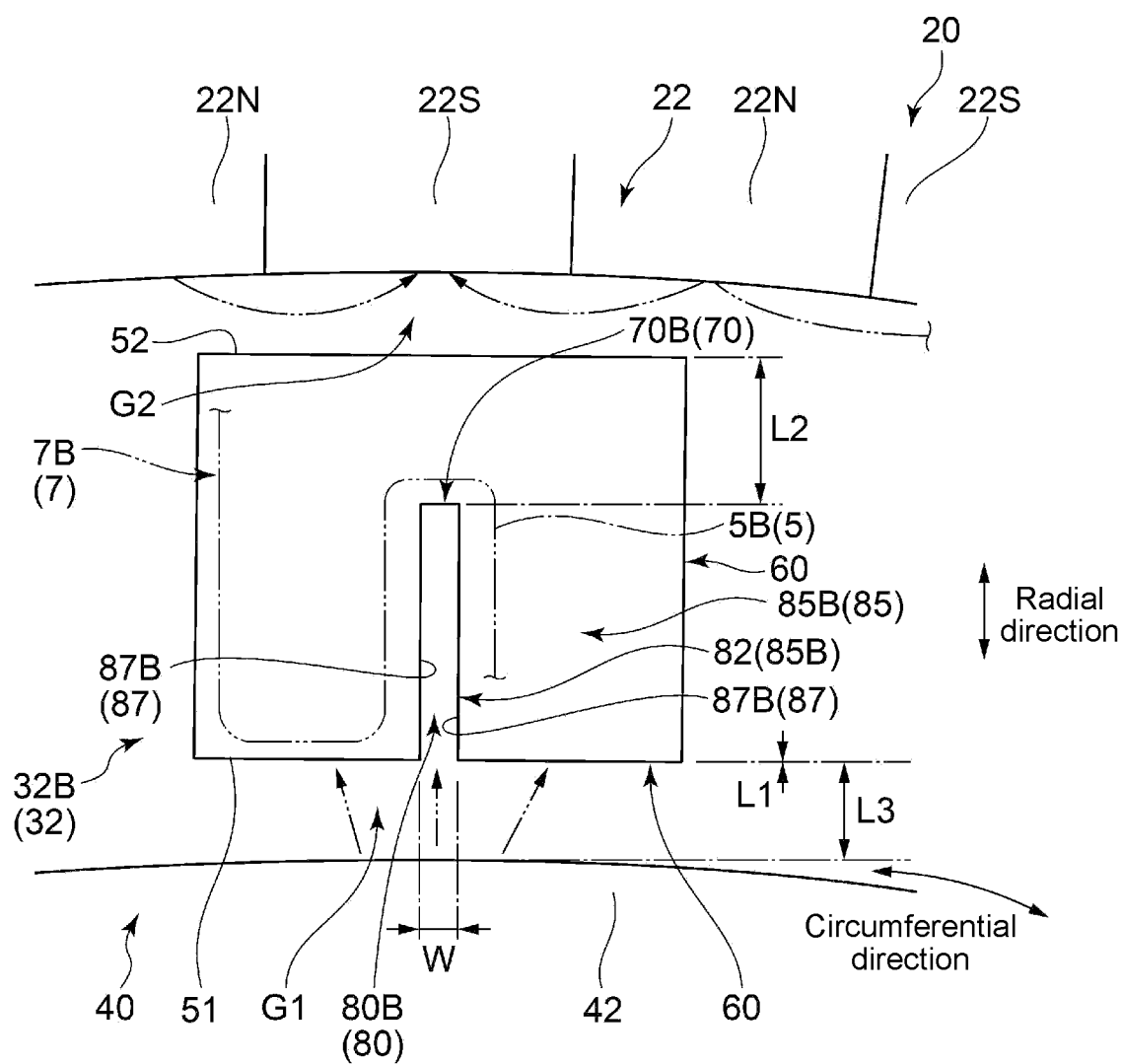
FIG. 4B is a cross-sectional view of the magnetic pole piece according to another embodiment.
Figure 4C:
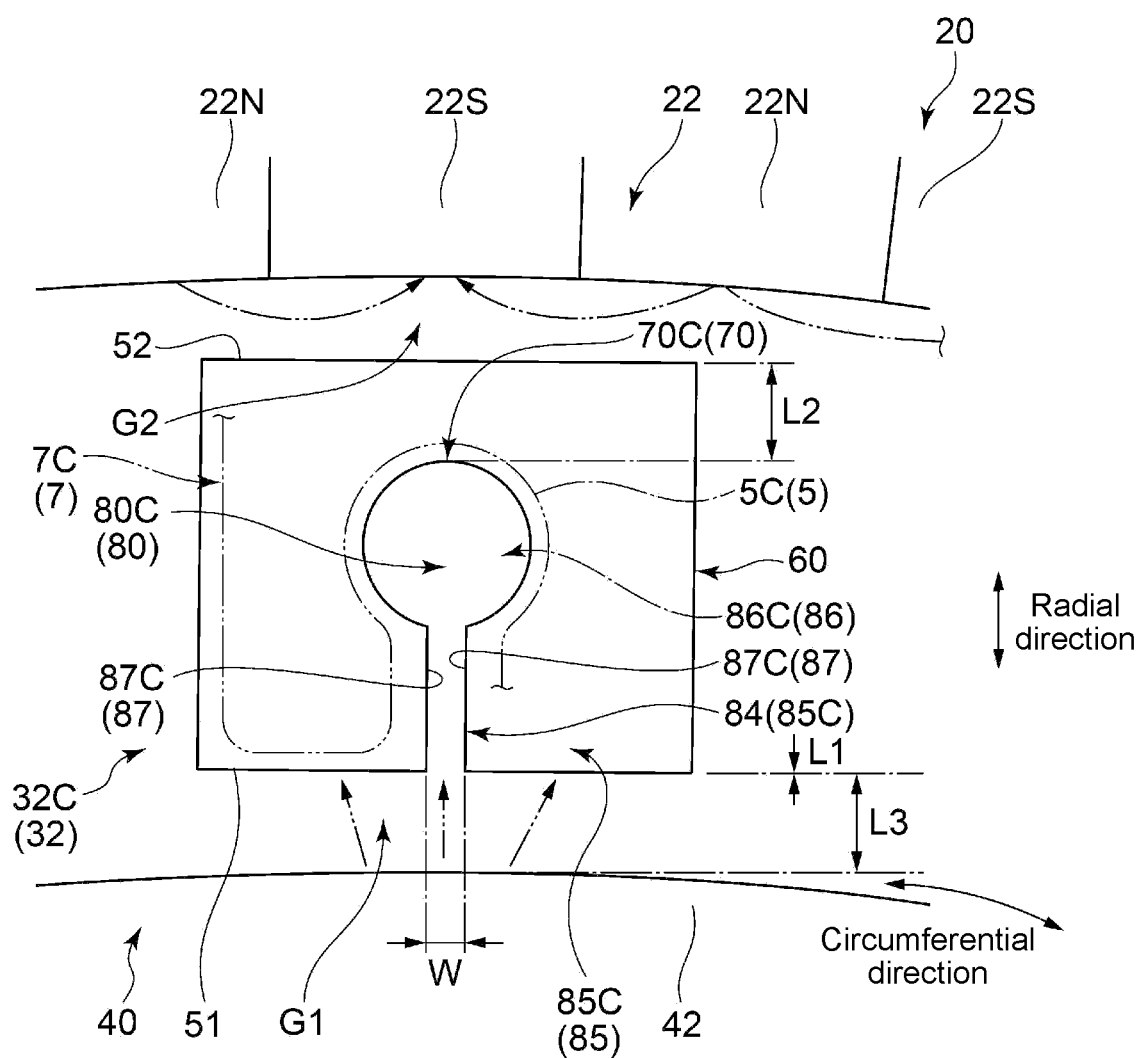
FIG. 4C is a cross-sectional view of the magnetic pole piece according to another embodiment.

FIGS. 4A and 4B illustrate an embodiment in which the plurality of connecting bars 36 (see FIG. 3) are not provided, and FIGS. 4C to 4G illustrate an embodiment in which the plurality of connecting bars 36 (see FIG. 3) are provided.

As shown in FIGS. 4A to 4G, the magnetic pole pieces 32A to 32G (32) include, in the radial cross section, an outer edge 60 and one or more inner edges 70A to 70G (70). The outer edge 60 forms a first face 51 of the magnetic pole piece 32, which is opposed to the rotor 40 with the first air gap G1 therebetween, and a second face 52 of the magnetic pole piece 32, which is opposed to the stator 20 with the second air gap G2 therebetween. The first face 51 faces one side in the radial direction and the second face 52 faces the other side in the radial direction.

The inner edge 70 is located between the first face 51 and the second face 52 in the radial direction so as to be surrounded by the outer edge 60, and defines one or more voids 80A to 80G (80) inside the magnetic pole piece 32. The eddy current that can be generated in each magnetic pole piece 32 by the leakage magnetic flux Lf (see FIG. 1A, 1B) tends to flow along the edge of the magnetic pole piece 32. In this regard, since the one or more inner edges 70 defining the one or more voids 80 are disposed, the eddy current path 7 includes paths 5A to 5G (5) along the inner edges 70, allowing the magnetic pole pieces 32 to lengthen eddy current paths 7A to 7G (7).

Further, in the radial cross section, a first distance L1 which is the shortest distance between the first face 51 and the voids 80A to 80G (80) in the radial direction is less than a second distance L2 which is the shortest distance between the second face and the void 80 in the radial direction. Therefore, the inner edge 70 is arranged on the rotor 40 side in the magnetic pole piece 32, making it possible to keep the void 80 away from the stator magnet 22 in the radial direction. Whereby, the magnetic path of the magnetic flux generated from the plurality of stator magnets 22 and flowing in the circumferential direction is prevented from being blocked by the void 80. The magnetic flux generated from the stator magnets 22 applies torque to the magnetic pole pieces 32.

In some embodiments where the magnetic geared rotating machine 10 is the magnetic geared generator 10A, the above-described torque applied to the magnetic pole piece 32 is torque for braking the magnetic pole piece rotor 30 rotating together with the rotational shaft 3. On the other hand, in some embodiments where the magnetic geared rotating machine 10 is the magnetic geared motor 10B, the above-described torque applied to the magnetic pole piece 32 is torque for assisting the rotation of the magnetic pole piece rotor 30.

Figure 4D:
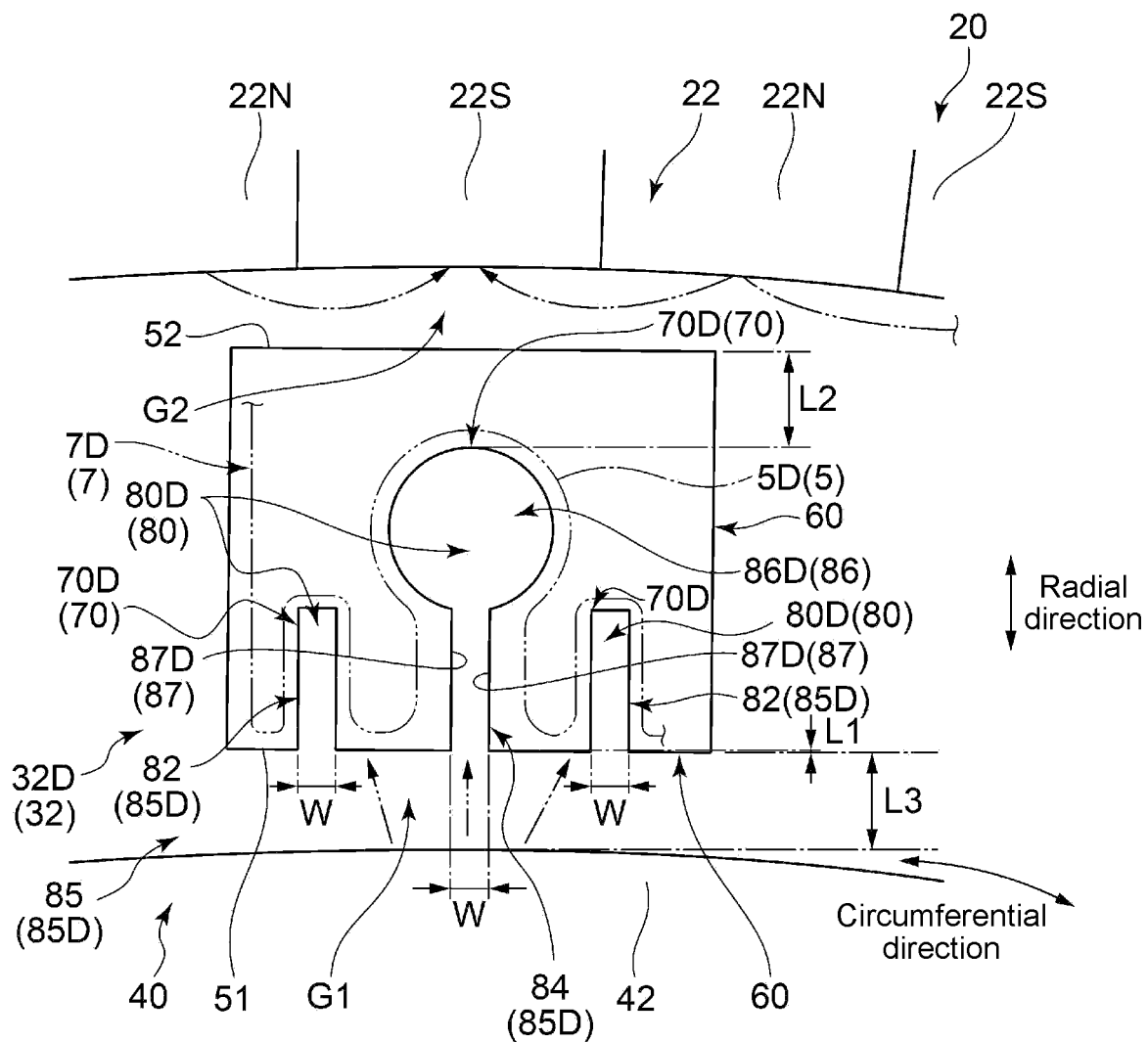
FIG. 4D is a cross-sectional view of the magnetic pole piece according to another embodiment.
Figure 4E:
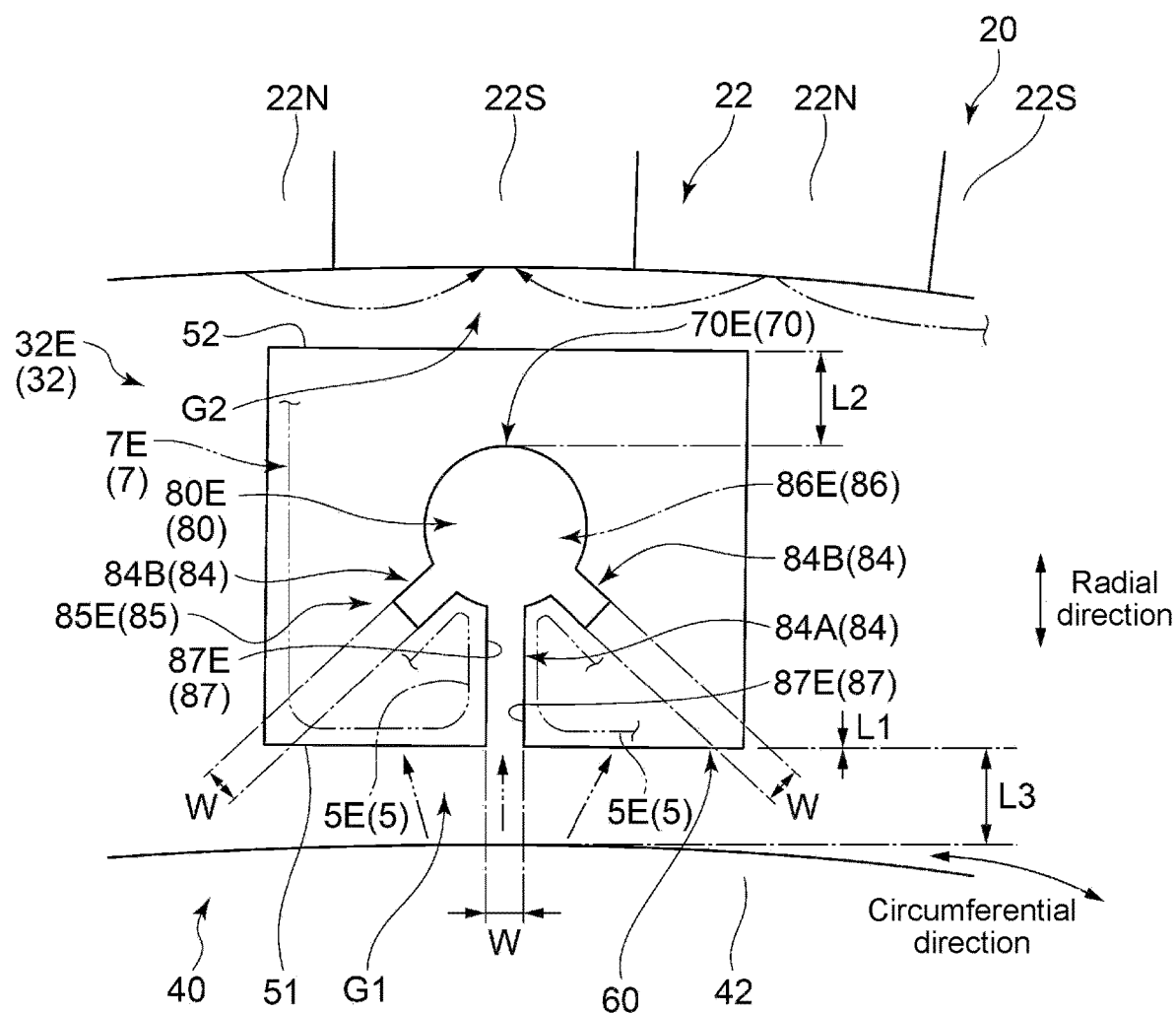
FIG. 4E is a cross-sectional view of the magnetic pole piece according to another embodiment.
Figure 4F:
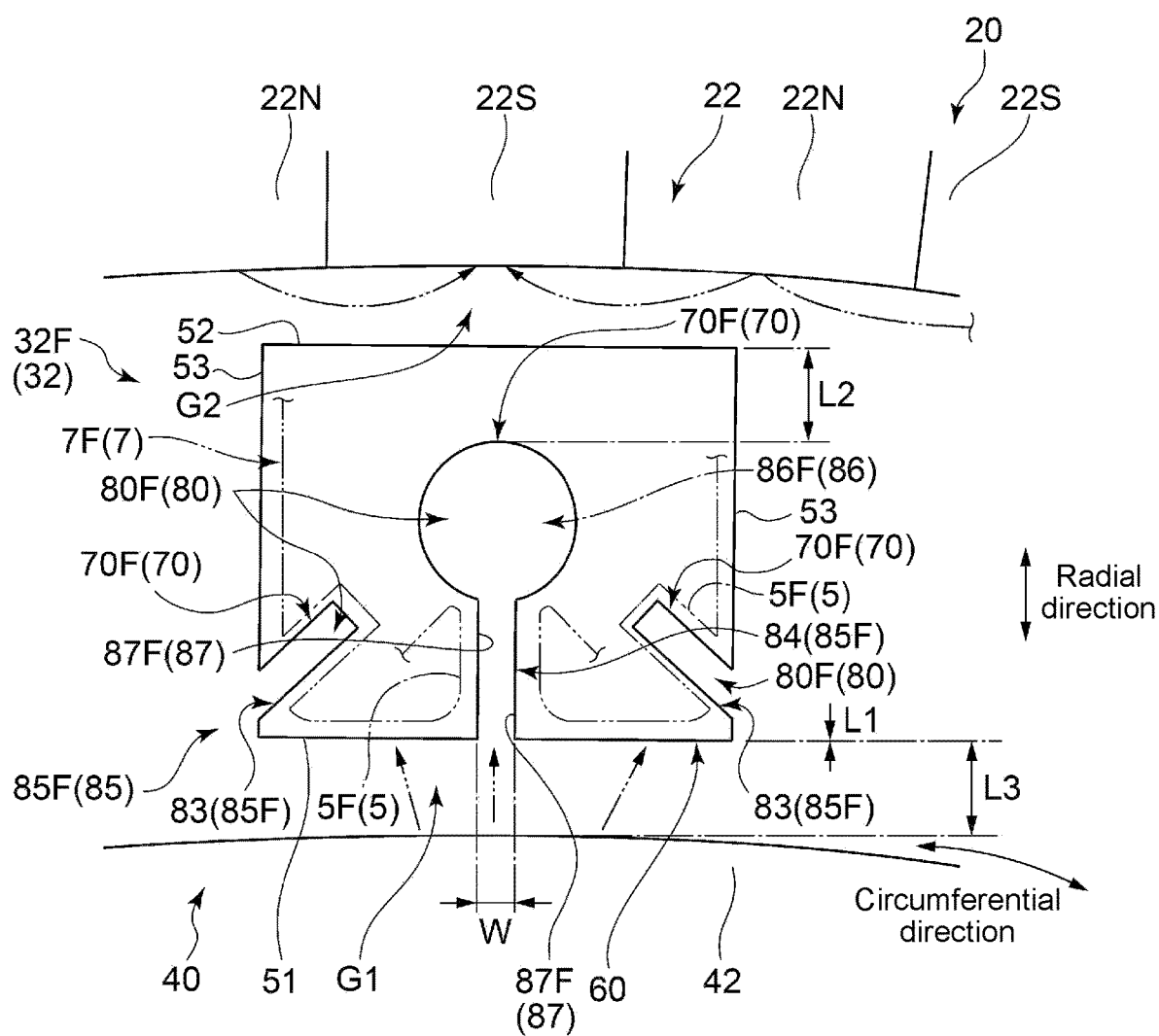
FIG. 4F is a cross-sectional view of the magnetic pole piece according to another embodiment.
Figure 4G:
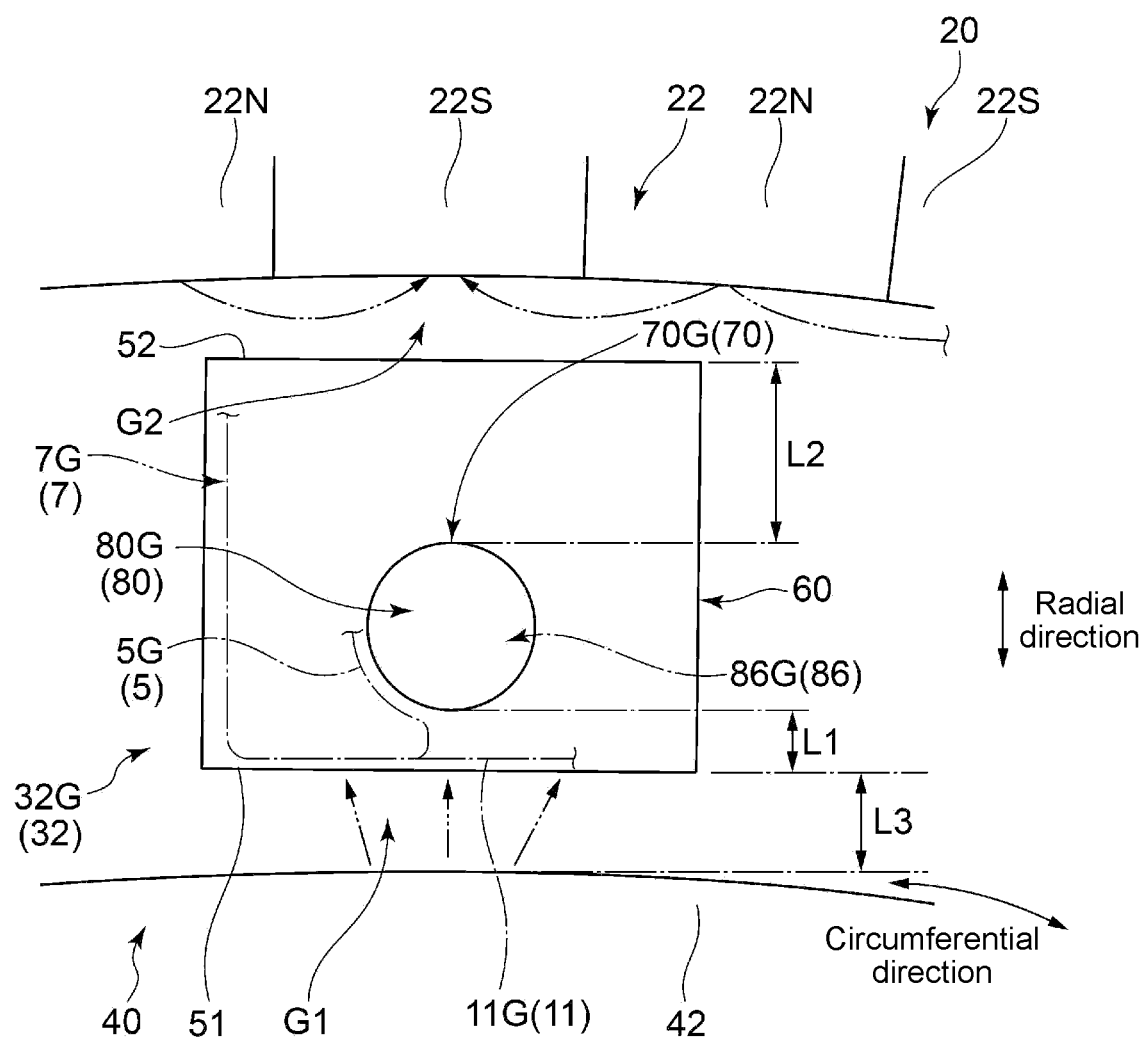
FIG. 4G is a cross-sectional view of the magnetic pole piece according to another embodiment.

As shown in FIGS. 4A and 4G, the voids 80A, 80G (80) of the magnetic pole pieces 32A, 32G (32) may be arranged such that the first distance L1 is greater than 0. In this case, the inner edges 70A, 70G (70) are not connected with the outer edge 60. The eddy current paths 7A, 7G (7) may include intermediate paths 11A, 11G between the voids 80A, 80G and the first face 51, in addition to the paths 5A, 5G (5) along the inner edges 70A, 70G.

On the other hand, as shown in FIGS. 4B to 4F, the voids 80B to 80F (80) may be arranged such that the first distance L1 is 0. In this case, since at least one of the inner edges 70B to 70F (70) is connected to the outer edge 60, the proportion of the eddy current induced in the paths 5B to 5F (5) along the inner edge 70 increases.

Further, as shown in FIGS. 4B to 4G, the voids 80B to 80G (80) may be arranged such that the first distance L1 is shorter than a shortest radial distance L3 from the rotor 40 to the outer edge 60. In this case, since the inner edge 70 is close to the outer edge 60 disposed on the rotor 40 side, the proportion of the eddy current induced in the paths 5B to 5G along the inner edge 70 increases. As shown in FIG. 4A, the first distance L1 may be longer than the shortest radial distance L3 from the rotor 40 to the outer edge 60.

As shown in FIGS. 4A to 4F, the magnetic pole pieces 32A to 32F (32) may include one or more slits 85A to 85F (85) that form at least part of the voids 80A to 80F (80) defined by the inner edges 70A to 70F (70). It is preferable that the magnetic path of the magnetic flux generated from the rotor magnets 42 and flowing in the radial direction is blocked as little as possible. In this respect, since the slits 85A to 85F form at least part of the voids 80A to 80F (80), it is suppressed in a width direction of the slits 85 that the magnetic path of the magnetic flux generated from the rotor magnets 42 is blocked by the voids 80.

As shown in FIGS. 4B and 4D, each of the slits 85B and 85D (85) may include at least one opening slit 82 opening on the first face 51. In this case, since at least part of the inner edges 70B and 70D (70) is connected to the outer edge 60, the proportion of the eddy current induced in the paths 5B and 5D (5) along the inner edge 70 further increases.

As shown in FIGS. 4D and 4F, the plurality of inner edges 70D and 70F (70) may be disposed. For example, the three inner edges 70D shown in FIG. 4D are connected to each other via the first face 51. Further, the inner edge 70F on the center side among the three inner edges 70F shown in FIG. 4F is connected to the remaining two inner edges 70F via the first face 51 and end faces 53 of the magnetic pole piece 32F in the circumferential direction. In FIGS. 4D and 4F, both the number of voids 80D (80) and the number of voids 80F (80) is three. Both the number of inner edges 70 and the number of voids 80 may be, for example, at least two or four.

As shown in FIGS. 4C to 4G, the magnetic pole pieces 32C to 2G (32) may be formed with axial holes 86C to 86G (86) as part of the voids 80C to 80G (80). In this case, each of the already-described connecting bars 36 (see FIG. 3) may be arranged within the axial holes 86C to 86G formed as part of the voids 80C to 80G.

Further, as shown in FIGS. 4C to 4F, the above-described slits 85C to 85F may include one or more communication slits 84 communicating with the axial holes 86C to 86F (86). Since the communication slit 84 communicates with the axial hole 86, it is possible to effectively extend the eddy current path 7 even if the axial hole 86 is formed in a central region of the magnetic pole piece 32.

Further, as shown in FIG. 4D, the at least one opening slit 82 described above may open on the first face 51 at a position displaced from the communication slit 84 in the circumferential direction. That is, the slit 85D (85) may include at least one opening slit 82 opening on the first face 51 at the position displaced from the communication slit 84 in the circumferential direction. In this case, the inner edge 70 defining the axial hole 86D and the communication slit 84, and the another inner edge 70 connected to said inner edge 70 via the first face 51 are arranged in the magnetic pole piece 32D. Whereby, it is possible to effectively extend the eddy current path 5D along the inner edge 70.

In the magnetic pole piece 32D shown in FIG. 4D, the number of communication slits 84 may be one and the number of opening slits 82 may be at least two. As a more specific example, the slit 85E (85) may include two opening slits 82 arranged at mutually symmetrical positions with one first communication slit 84A interposed therebetween. In this case, the eddy current path 5D along the inner edge 70D is formed on each of one side and the other side in the circumferential direction with respect to the communication slit 84. Since a portion of the magnetic pole piece 32D where the eddy current is generated is prevented from being biased in the circumferential direction, it is possible to suppress an excessive temperature rise of only the specific portion of the magnetic pole piece 32D.

Further, as shown in FIG. 4E, the plurality of communication slits 84 communicating with the axial hole 86E (86) may be disposed. For example, the communication slit 84 may include a first communication slit 84A opening on the first face 51, and at least one second communication slit 84B arranged at a position deviated with respect to the first communication slit 84A in the circumferential direction and a position deviated with respect to the first face 51 in the radial direction. In this case, it is possible to effectively extend the eddy current path 5E along the one inner edge 70E defining the axial hole 86E, the first communication slit 84A, and the second communication slit 84B.

In the magnetic pole piece 32E shown in FIG. 4E, the number of first communication slits 84A may be one and the number of second communication slits 84B may be at least two. As a more specific example, the slit 85E (85) may include two second communication slits 84B arranged at mutually symmetrical positions with one first communication slit 84A interposed therebetween. In this case, the eddy current path 5E along the inner edge 70E is formed on each of the one side and the other side in the circumferential direction with respect to the first communication slit 84A. Since a portion of the magnetic pole piece 32E where the eddy current is generated is prevented from being biased in the circumferential direction, it is possible to suppress an excessive temperature rise of only the specific portion of the magnetic pole piece 32E.

Further, as shown in FIG. 4F, the slit 85F (85) may include at least one end face opening slit 83. The end face opening slit 83 is arranged at a position deviated with respect to the axial hole 86F (86) in the circumferential direction, and opens on the end face 53 of the magnetic pole piece 32F (32) in the circumferential direction. In this case, the inner edge 70 defining the axial hole 86F and the communication slit 84, and the another inner edge 70 connected to said inner edge 70 via the first face 51 and the end face 53 are arranged. Whereby, it is possible to effectively extend the eddy current path 5F along the inner edge 70. The end face 53 may be one end face of the magnetic pole piece 32F in the circumferential direction or may be both end faces of the magnetic pole piece 32F in the circumferential direction.

In the magnetic pole piece 32F shown in FIG. 4F, the number of communication slits 84 may be one and the number of end face opening slits 83 may be at least two. As a more specific example, the slit 85F (85) may include two end face opening slits 83 arranged at mutually symmetrical positions with one communication slit 84 interposed therebetween. In this case, the path 5F along the inner edge 70F is formed on each of the one side and the other side in the circumferential direction with respect to the communication slit 84. Since a portion of the magnetic pole piece 32F where the eddy current is generated is prevented from being biased in the circumferential direction, it is possible to suppress an excessive temperature rise of only the specific portion of the magnetic pole piece 32D.

Figure 5:
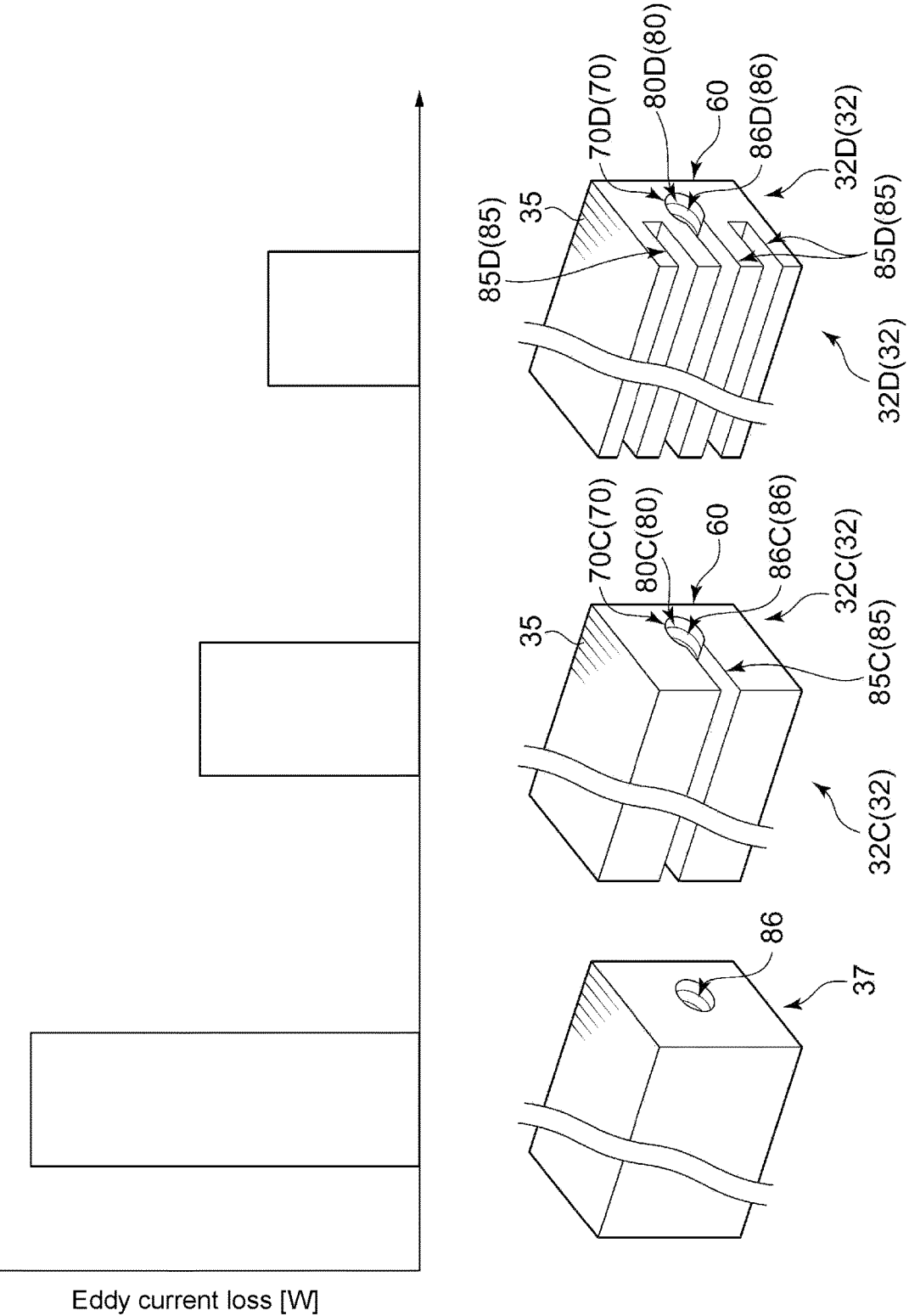
FIG. 5 is a view showing an effect of reducing an eddy current loss according to an embodiment.

Further, the inner edges 70C, 70D (70) may define the voids 80C, 80D (80) over the entire range of the magnetic geared rotating machine 10 in the axial direction (see FIG. 5). As a more specific example, all of the electrical steel sheets 35 included in the magnetic pole pieces 32C, 32D may include the inner edges 70C, 70D defining the voids 80C, 80D.

In another embodiment, the inner edges 70C, 70D may define the voids 80C, 80D in part of the magnetic geared rotating machine 10 in the axial direction. As a more specific example, some of the electrical steel sheets 35 included in the magnetic pole pieces 32C, 32D may include the inner edges 70C, 70D defining the voids 80C, 80D.

As shown in FIGS. 4A to 4F, the inner edges 70A to 70F (70) may include a pair of linear portions 87A to 87F (87) opposed to each other with the voids 80A to 80F (80) interposed therebetween in the radial cross section.

The width (dimension W) of each of the voids 80A to 80F between the pair of linear portions 87 may be not greater than four times the thickness of each electrical steel sheet 35 (see FIG. 1). Whereby, since the width of each of the voids 80A to 80F can be narrowed, it is possible to prevent the magnetic path of the magnetic flux generated from the rotor magnet 42 from being blocked by the voids 80A to 80F.

Further, the width (dimension W) of each of the voids 80A to 80F between the pair of linear portions 87 may be not less than twice the thickness of each electrical steel sheet 35 (see FIG. 1). Since the width (dimension W) of each of the voids 80A to 80F is sufficiently greater than the thickness of the electrical steel sheet 35, the electrical steel sheet 35 can stably be processed.

FIG. 5 is a view showing an effect of reducing an eddy current loss according to an embodiment.

FIG. 5 shows results obtained by simulation of the eddy current loss when the magnetic geared motor 10B is driven under prescribed conditions by using each of a comparative example 37 and the magnetic pole pieces 32C, 32D.

The electrical steel sheets 35 adopted in the comparative example 37 and the magnetic pole pieces 32C, 32D are the same in material, external dimension, and the number of laminated sheets. The magnetic pole piece shown in the comparative example 37 is formed with the axial hole 86 in the center.

As shown in FIG. 5, it can be seen that the eddy current loss is reduced as the number of disposed slits 85 increases. It is considered this is because as the number of slits 85 increases, the path 5 along the inner edge 70 becomes longer, resulting in an increase in eddy current resistance in the magnetic pole piece 32 and a reduction in eddy current.

The principle of generating the leakage magnetic flux Lf is the same between the magnetic geared motor 10B and the magnetic geared generator 10A. Therefore, the same result as in FIG. 5 is obtained also in the simulation of the eddy current when the magnetic geared rotating machine 10 is operated instead of the magnetic geared motor 10B. That is, in the magnetic geared generator 10A as well, the eddy current loss is lowest in the case where the magnetic pole piece 32D is adopted among the comparative example 37 and the magnetic pole pieces 32C, 32D.

CONCLUSION

Hereinafter, the overview of the magnetic geared rotating machine 10 and the power generation system 1 using the same according to some embodiments will be described.

(1) A magnetic geared rotating machine (10) according to at least one embodiment of the present disclosure is a magnetic geared rotating machine (10) that includes: a stator (20) which includes a plurality of stator magnets (22) arranged so as to be aligned in a circumferential direction; a rotor (40) which includes a plurality of rotor magnets (42) arranged so as to be aligned in the circumferential direction, and in which the number of magnetic poles of the plurality of rotor magnets (42) is less than the number of magnetic poles of the plurality of stator magnets (22); and a magnetic pole piece rotor (30) which includes a plurality of magnetic pole pieces (32) arranged so as to be aligned in the circumferential direction at a radial position between the stator (20) and the rotor (40). In a radial cross section of the magnetic geared rotating machine (10), each of the magnetic pole pieces (32) includes: an outer edge (60) forming a first face (51) of the magnetic pole piece (32), which is opposed to the rotor (40) with a first air gap (G1) therebetween, and a second face (52) of the magnetic pole piece (32), which is opposed to the stator (20) with a second air gap (G2) therebetween; and at least one inner edge (70) which is located between the first face (51) and the second face (52) in a radial direction so as to be surrounded by the outer edge (60), and defines at least one void (80) inside the magnetic pole piece (32). In the radial cross section, a first distance (L1) which is a shortest distance between the first face (51) and the void (80) in the radial direction is shorter than a second distance (L2) which is a shortest distance between the second face (52) and the void (80) in the radial direction.

With the above configuration (1), the eddy current path (7), which is the path of the eddy current generated in the magnetic pole piece (32) due to the operation of the magnetic geared rotating machine (10), includes the path (5) along the at least one inner edge (70), allowing the magnetic geared rotating machine (10) to lengthen the eddy current path (7). Therefore, the eddy current resistance in the magnetic pole piece (32) increases and the eddy current is reduced. Further, since the first distance (L1) is shorter than the second distance (L2), the at least one inner edge (70) is arranged on the rotor (40) side, making it possible to keep the at least one void (80) away from the stator (20) in the radial direction. Therefore, that the magnetic path of the magnetic flux generated from the plurality of stator magnets (22) and flowing in the circumferential direction is prevented from being blocked by the at least one void (80). Whereby, inhibition of the rotation of the magnetic pole piece rotor (30) is suppressed. In view of the above, the magnetic geared rotating machine (10) is implemented which is capable of reducing an eddy current loss while suppressing blocking of the magnetic path of the stator magnet (22).

(2) In some embodiments, in the above configuration (1), each of the magnetic pole pieces (32) includes a plurality of electrical steel sheets (35) laminated in an axial direction of the magnetic geared rotating machine (10), the inner edge (70) includes a pair of linear portions (87) opposed to each other with the void (80) interposed therebetween in the radial cross section, and a width (dimension W) of the void (80) between the pair of linear portions (87) is not greater than four times a thickness of each of the electrical steel sheets (35).

With the above configuration (2), since the magnetic geared rotating machine (10) can narrow the width (dimension W) of the void (80), it is possible to prevent the magnetic path of the magnetic flux generated from the rotor magnet (42) and flowing in the radial direction from being blocked by the void (80).

(3) In some embodiments, in the above configuration (1) or (2), each of the magnetic pole pieces (32) includes a plurality of electrical steel sheets (35) laminated in an axial direction of the magnetic geared rotating machine (10), the inner edge (70) includes a pair of linear portions (87) opposed to each other with the void (80) interposed therebetween in the radial cross section, and a width (dimension W) of the void (80) between the pair of linear portions (87) is not less than twice a thickness of each of the electrical steel sheets (35).

With the above configuration (3), since the width of the void (80) is sufficiently greater than the thickness of the electrical steel sheet (35), the electrical steel sheet (35) can stably be processed. For example, in an embodiment where the electrical steel sheet (35) is produced by press working, the large width (dimension W) of the void (80) can enlarge a punch to be used for the working. Therefore, the durability of the punch is improved, making it possible to stably press the electrical steel sheet (35).

(4) In some embodiments, in any of the above configurations (1) to (3), the first distance (L1) is shorter than a shortest radial distance (L3) from the rotor (40) to the outer edge (60).

With the above configuration (4), since the inner edge (70) is close to the outer edge (60) disposed on the rotor (40) side, the proportion of the eddy current induced in the path (5) along the inner edge (70) increases. Therefore, the magnetic geared rotating machine (10) can further reduce the eddy current.

(5) In some embodiments, in any of the above configurations (1) to (4), each of the magnetic pole pieces (32) includes at least one slit (85) forming at least part of the void (80) defined by the inner edge (70).

With the above configuration (5), since the magnetic pole piece (32) includes the slit (85) forming the at least part of the void (80), it is possible to suppress in a width direction of the slit (85) that the magnetic path of the magnetic flux generated from the rotor magnet (42) and flowing in the radial direction is blocked by the void (80).

(6) In some embodiments, in the above configuration (5), the slit (85) includes at least one opening slit (82) opening on the first face (51).

With the above configuration (6), since the inner edge (70) is connected to the outer edge (60), the proportion of the eddy current induced in the path (5) along the inner edge (70) increases. Therefore, the magnetic geared rotating machine (10) can further reduce the eddy current.

(7) In some embodiments, in any of the above configurations (1) to (6), the magnetic pole piece rotor (30) includes: a pair of end rings (34) respectively located on both sides in an axial direction with the plurality of magnetic pole pieces (32) interposed therebetween; and a plurality of connecting bars (36) extending in the axial direction between the pair of end rings (34), and each of the connecting bars (36) is arranged within an axial hole (86) formed as part of the void (80) in each of the magnetic pole pieces (32).

With the above configuration (7), the magnetic pole piece rotor (30) can form the assembly of the plurality of magnetic pole pieces (32). Further, the inner wall of the axial hole (86) in the magnetic pole piece (32), which is used to mount the connecting bar (36), can be used as the inner edge (70) for lengthening the eddy current path (7). Whereby, the magnetic geared rotating machine (10) can further reduce the eddy current path.

(8) In some embodiments, in the above configuration (7), each of the magnetic pole pieces (32) includes at least one slit (85) forming at least part of the void (80) defined by the inner edge (70), and the slit (85) includes at least one communication slit (84) communicating with the axial hole (86).

With the above configuration (8), the axial hole (86) tends to be formed in the central region of the magnetic pole piece (32) from the viewpoint of securely supporting the magnetic pole piece (32) by the connecting bar (36), and thus the effect of extending the eddy current path (7) cannot be expected so much. To cope therewith, since by arranging the communication slit (84) communicating with the axial hole (86), it is possible to effectively extend the eddy current path (7).

(9) In some embodiments, in the above configuration (8), the communication slit (84) opens on the first face, and the slit (85) includes at least one opening slit (82) opening on the first face at a position displaced from the communication slit (84) in the circumferential direction.

With the above configuration (9), since at least part of the inner edge (70) is connected to the outer edge (60), the proportion of the eddy current induced in the path (5) along the inner edge (70) further increases.

(10) In some embodiments, in the above configuration (9), the slit (85) includes the two opening slits (82) arranged at mutually symmetrical positions with the one communication slit (84) interposed therebetween.

With the above configuration (10), the inner edge (70) defining the axial hole (86) and the communication slit (84), and the another inner edge (70) connected to said inner edge (70) via the first face (51) are arranged. Whereby, it is possible to effectively extend the eddy current path (5) along the inner edge (70).

(11) In some embodiments, in the above configuration (8), the communication slit (85) includes: a first communication slit (85A) opening on the first face (51); and at least one second communication slit (85B) arranged at a position deviated with respect to the first communication slit (85A) in the circumferential direction and a position deviated with respect to the first face (51) in the radial direction.

With the above configuration (11), it is possible to effectively extend the eddy current path (5) along the one inner edge (70) defining the axial hole (86), the first communication slit (85A), and the second communication slit (85B).

(12) In some embodiments, in the above configuration (11), the communication slit includes the two second communication slits (84B) arranged at mutually symmetrical positions with the one first communication slit interposed therebetween.

With the above configuration (12), the eddy current path (5) along the inner edge (70) is formed on each of the one side and the other side in the circumferential direction with respect to the first communication slit (84A). Since a portion of the magnetic pole piece (32) where the eddy current is generated is prevented from being biased in the circumferential direction, it is possible to suppress an excessive temperature rise of only the specific portion of the magnetic pole piece (32).

(13) In some embodiments, in the above configuration (8), the slit (85) includes at least one end face opening slit (83) which is arranged at a position deviated with respect to the axial hole (86) in the circumferential direction, and opens on an end face (53) of the magnetic pole pieces (32) in the circumferential direction.

With the above configuration (13), the inner edge (70) defining the axial hole (86) and the communication slit (84), and the another inner edge (70) connected to said inner edge (70) via the first face (51) and the end face (53) are arranged. Whereby, it is possible to effectively extend the eddy current path (5) along the inner edge (70).

(14) In some embodiments, in the above configuration (13), the slit (85) includes the two end face opening slits (83) arranged at mutually symmetrical positions with the one communication slit (84) interposed therebetween.

With the above configuration (14), the path (5) along the inner edge (70) is formed on each of the one side and the other side in the circumferential direction with respect to the communication slit (84). Since a portion of the magnetic pole piece (32) where the eddy current is generated is prevented from being biased in the circumferential direction, it is possible to suppress an excessive temperature rise of only the specific portion of the magnetic pole piece (32).

(15) In some embodiments, in any of the above configurations (1) to (14), each of the magnetic pole pieces (32) includes the inner edge (70) defining the void (80) over an entire range of the magnetic geared rotating machine (10) in an axial direction.

With the above configuration (15), the magnetic geared rotating machine (10) can reduce the eddy current generated in the magnetic pole pieces (32), over the entire range of the magnetic geared rotating machine (10) in the axial direction.

(16) A power generation system (1) according to at least one embodiment of the present invention, includes: a prime mover (2); and the magnetic geared rotating machine (10) as defined in any of the above (1) to (15), which serves as a magnetic gear generator (10A) driven by an input from the prime mover (2) to generate power.

With the above configuration (16), for the reason described in the above (1), the power generation system (1) is implemented which is capable of reducing the eddy current loss while suppressing blocking of the magnetic path of the stator magnet (22).

(17) A magnetic pole piece rotor (30) according to at least one embodiment of the present invention, includes: a plurality of magnetic pole pieces (32) arranged so as to be aligned in a circumferential direction; and a plurality of holders (39) arranged in the circumferential direction alternately with the plurality of magnetic pole pieces (32). In a radial cross section, each of the magnetic pole pieces (32) includes: an outer edge (60) forming a first face (51) facing one side in a radial direction and a second face (52) facing the other side in the radial direction; and at least one inner edge (70) which is located between the first face (51) and the second face (52) in the radial direction so as to be surrounded by the outer edge, and defines at least one void (80) inside the magnetic pole piece (32). In the radial cross section, a first distance (L1) which is a shortest distance between the first face (51) and the void (80) in the radial direction is shorter than a second distance (L2) which is a shortest distance between the second face (52) and the void (80) in the radial direction.

With the above configuration (17), for the reason described in the above (1), the magnetic pole piece rotor (30) is implemented which is capable of reducing the eddy current loss while suppressing blocking of the magnetic path of the stator magnet (22).

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1: Power generation system
2: Prime mover
10: Magnetic geared rotating machine
20: Stator
22: Stator magnet
30: Magnetic pole piece rotor
32: Magnetic pole piece
34: End ring
35: Electrical steel sheet
36: Connecting bar
39: Holder
40: Rotor
42: Rotor magnet
51: First face
52: Second face
60: Outer edge
70: Inner edge
80: Void
82: Opening slit
83: End face opening slit
84: Communication slit
84A: First communication slit
84B: Second communication slit
85: Slit
86: Axial hole
87: Linear portion
G1: First air gap
G2: Second air gap
L1: First distance
L2: Second distance
L3: Radial distance

The invention claimed is:

1. A magnetic geared rotating machine, comprising:
a stator which includes a plurality of stator magnets arranged so as to be aligned in a circumferential direction;
a rotor which includes a plurality of rotor magnets arranged so as to be aligned in the circumferential direction, and in which a number of magnetic poles of the plurality of rotor magnets is less than a number of magnetic poles of the plurality of stator magnets; and
a magnetic pole piece rotor which includes a plurality of magnetic pole pieces arranged so as to be aligned in the circumferential direction at a radial position between the stator and the rotor,
wherein, in a radial cross section of the magnetic geared rotating machine, each of the magnetic pole pieces includes:
an outer edge forming a first face of the magnetic pole piece, which is opposed to the rotor with a first air gap therebetween, and a second face of the magnetic pole piece, which is opposed to the stator with a second air gap therebetween; and
at least one inner edge which is located between the first face and the second face in a radial direction so as to be surrounded by the outer edge, and defines at least one void inside the magnetic pole piece,
wherein, in the radial cross section, a first distance which is a shortest distance between the first face and the void in the radial direction is shorter than a second distance which is a shortest distance between the second face and the void in the radial direction,
wherein the magnetic pole piece rotor includes:
a pair of end rings respectively located on both sides in an axial direction of the magnetic geared rotating machine with the plurality of magnetic pole pieces interposed therebetween; and
a plurality of connecting bars extending in the axial direction between the pair of end rings, and
wherein each of the connecting bars is arranged within an axial hole formed as part of the void in each of the magnetic pole pieces.

2. The magnetic geared rotating machine according to claim 1,
wherein each of the magnetic pole pieces includes a plurality of electrical steel sheets laminated in the axial direction,
wherein the inner edge includes a pair of linear portions opposed to each other with the void interposed therebetween in the radial cross section, and
wherein a width of the void between the pair of linear portions is not greater than four times a thickness of each of the electrical steel sheets.

3. The magnetic geared rotating machine according to claim 1,
wherein each of the magnetic pole pieces includes a plurality of electrical steel sheets laminated in the axial direction,
wherein the inner edge includes a pair of linear portions opposed to each other with the void interposed therebetween in the radial cross section, and wherein a width of the void between the pair of linear portions is not less than twice a thickness of each of the electrical steel sheets.

4. The magnetic geared rotating machine according to claim 1, wherein the first distance is shorter than a shortest radial distance from the rotor to the outer edge.

5. The magnetic geared rotating machine according to claim 1, wherein each of the magnetic pole pieces includes at least one slit forming at least part of the void defined by the inner edge.

6. The magnetic geared rotating machine according to claim 5, wherein the slit includes at least one opening slit opening on the first face.

7. The magnetic geared rotating machine according to claim 1,
wherein each of the magnetic pole pieces includes at least one slit forming at least part of the void defined by the inner edge, and
wherein the slit includes at least one communication slit communicating with the axial hole.

8. The magnetic geared rotating machine according to claim 7,
wherein the communication slit opens on the first face, and
wherein the slit includes at least one opening slit opening on the first face at a position displaced from the communication slit in the circumferential direction.

9. The magnetic geared rotating machine according to claim 8, wherein the slit includes the two opening slits arranged at mutually symmetrical positions with the one communication slit interposed therebetween.

10. The magnetic geared rotating machine according to claim 7, wherein the communication slit includes:
a first communication slit opening on the first face; and
at least one second communication slit arranged at a position deviated with respect to the first communication slit in the circumferential direction and a position deviated with respect to the first face in the radial direction.

11. The magnetic geared rotating machine according to claim 10, wherein the communication slit includes the two second communication slits arranged at mutually symmetrical positions with the one first communication slit interposed therebetween.

12. The magnetic geared rotating machine according to claim 7, wherein the slit includes at least one end face opening slit which is arranged at a position deviated with respect to the axial hole in the circumferential direction, and opens on an end face of the magnetic pole pieces in the circumferential direction.

13. The magnetic geared rotating machine according to claim 12, wherein the slit includes the two end face opening slits arranged at mutually symmetrical positions with the one communication slit interposed therebetween.

14. The magnetic geared rotating machine according to claim 1,
wherein each of the magnetic pole pieces includes the inner edge defining the void over an entire range of the magnetic geared rotating machine in the axial direction.

15. A power generation system, comprising:
a prime mover; and
the magnetic geared rotating machine according to claim 1, which serves as a magnetic gear generator driven by an input from the prime mover to generate power.

16. A magnetic geared rotating machine, comprising:
a stator which includes a plurality of stator magnets arranged so as to be aligned in a circumferential direction;
a rotor which includes a plurality of rotor magnets arranged so as to be aligned in the circumferential direction, and in which a number of magnetic poles of the plurality of rotor magnets is less than a number of magnetic poles of the plurality of stator magnets; and
a magnetic pole piece rotor which includes a plurality of magnetic pole pieces arranged so as to be aligned in the circumferential direction at a radial position between the stator and the rotor,
wherein, in a radial cross section of the magnetic geared rotating machine, each of the magnetic pole pieces includes:
an outer edge forming a first face of the magnetic pole piece, which is opposed to the rotor with a first air gap therebetween, and a second face of the magnetic pole piece, which is opposed to the stator with a second air gap therebetween; and
at least one inner edge which is located between the first face and the second face in a radial direction so as to be surrounded by the outer edge, and defines at least one void inside the magnetic pole piece,
wherein, in the radial cross section, a first distance which is a shortest distance between the first face and the void in the radial direction is shorter than a second distance which is a shortest distance between the second face and the void in the radial direction, and
wherein, in the radial cross section, the second face is flat over an entire circumferential length of the magnetic pole piece.

17. The magnetic geared rotating machine according to claim 16,
wherein, in the radial cross section, the void includes:
an axial hole which is a space opened in an axial direction of the magnetic geared rotation machine; and
a communication slit which is located on a radially inner side of the axial hole and communicates with the axial hole,
wherein the inner edge includes a pair of linear portions opposed to each other with the communication slit interposed therebetween, and
wherein a maximum circumferential dimension of the axial hole in the axial direction is greater than a width of the communication slit between the pair of linear portions.

18. A magnetic geared rotating machine, comprising:
a stator which includes a plurality of stator magnets arranged so as to be aligned in a circumferential direction;
a rotor which includes a plurality of rotor magnets arranged so as to be aligned in the circumferential direction, and in which a number of magnetic poles of the plurality of rotor magnets is less than a number of magnetic poles of the plurality of stator magnets; and
a magnetic pole piece rotor which includes a plurality of magnetic pole pieces arranged so as to be aligned in the circumferential direction at a radial position between the stator and the rotor,
wherein, in a radial cross section of the magnetic geared rotating machine, each of the magnetic pole pieces includes:
an outer edge forming a first face of the magnetic pole piece, which is opposed to the rotor with a first air gap therebetween, and a second face of the magnetic pole piece, which is opposed to the stator with a second air gap therebetween; and at least one inner edge which is located between the first face and the second face in a radial direction so as to be surrounded by the outer edge, and defines at least one void inside the magnetic pole piece, wherein, in the radial cross section, a first distance which is a shortest distance between the first face and the void in the radial direction is shorter than a second distance which is a shortest distance between the second face and the void in the radial direction, wherein, in the radial cross section, the void includes:

an axial hole which is a space opened in an axial direction of the magnetic geared rotating machine; and a communication slit which is located on a radially inner side of the axial hole and communicates with the axial hole, wherein the inner edge includes a pair of linear portions opposed to each other with the communication slit interposed therebetween, and wherein a maximum circumferential dimension of the axial hole in the axial direction is greater than a width of the communication slit between the pair of linear portions.

\* \* \* \* \*